United States Patent [19]
Elmaleh

[11] Patent Number: 5,820,804
[45] Date of Patent: Oct. 13, 1998

[54] APPARATUS AND METHOD FOR SHAPING AN ELONGATED MEMBER

[76] Inventor: Jon Elmaleh, 61 Greenpoint Ave., Brooklyn, N.Y. 11222

[21] Appl. No.: 666,250

[22] Filed: Jun. 20, 1996

[51] Int. Cl.⁶ ................................................. B29C 70/52
[52] U.S. Cl. .................. 264/167; 156/172; 156/173; 156/180; 156/441; 264/103; 264/136; 264/257; 425/501; 425/505; 425/329
[58] Field of Search .................. 156/166, 167, 156/180, 441, 244.12, 169, 172, 173; 264/257, 258, 136, 137, 103, 167; 425/329, 501, 505

[56] References Cited

U.S. PATENT DOCUMENTS

| | | |
|---|---|---|
| 3,969,016 | 7/1976 | Kaiser et al. ............... 156/244.12 |
| 4,469,541 | 9/1984 | Goldsworthy ................... 156/180 |
| 5,026,447 | 6/1991 | O'Connor ........................ 156/166 |
| 5,026,514 | 6/1991 | Hauwiller et al. .............. 264/258 |
| 5,182,060 | 1/1993 | Berecz ............................ 156/166 |
| 5,556,496 | 9/1996 | Sumerak ......................... 156/166 |

*Primary Examiner*—Mathieu D. Vargot
*Attorney, Agent, or Firm*—Notaro & Michalos PC

[57] ABSTRACT

A method and apparatus for shaping an elongated member so that it has a smoothly varying shape along its length utilizes first and second elements which define an aperture therebetween. The elements are advantageously roller elements having grooves around their circumference which change in size and shape. A core die can be used for creating the interior of the element and a fiber weave can be wrapped around the core die to create the body of the elongated member. The core is pulled through the aperture between the first and second elements as the elements rotate in opposite directions to create the varying shape.

15 Claims, 10 Drawing Sheets

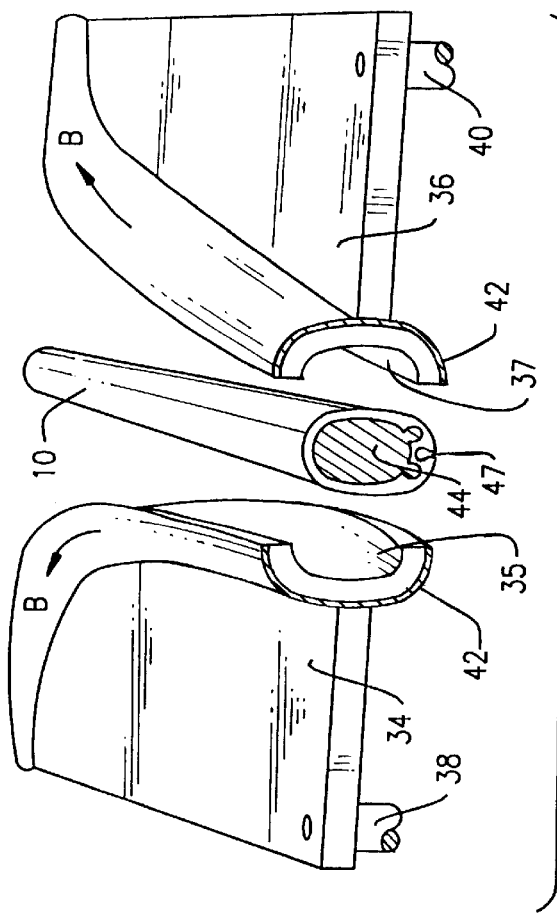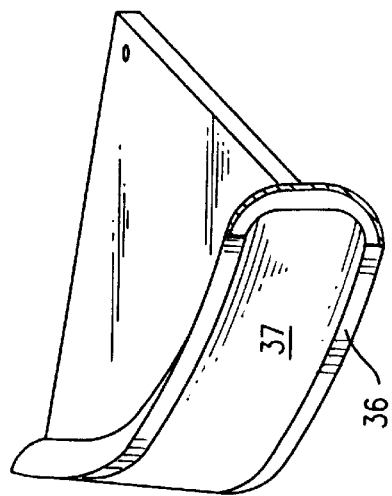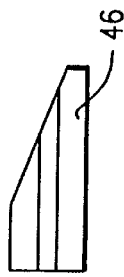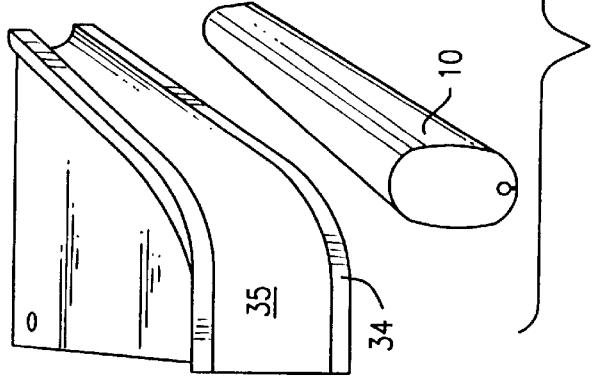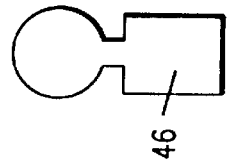

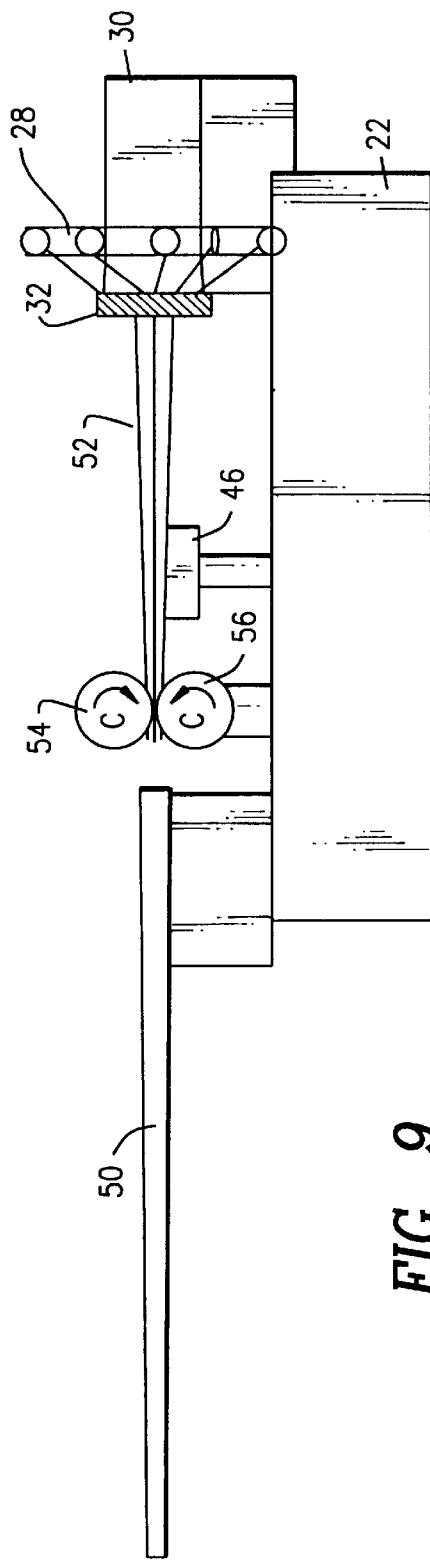
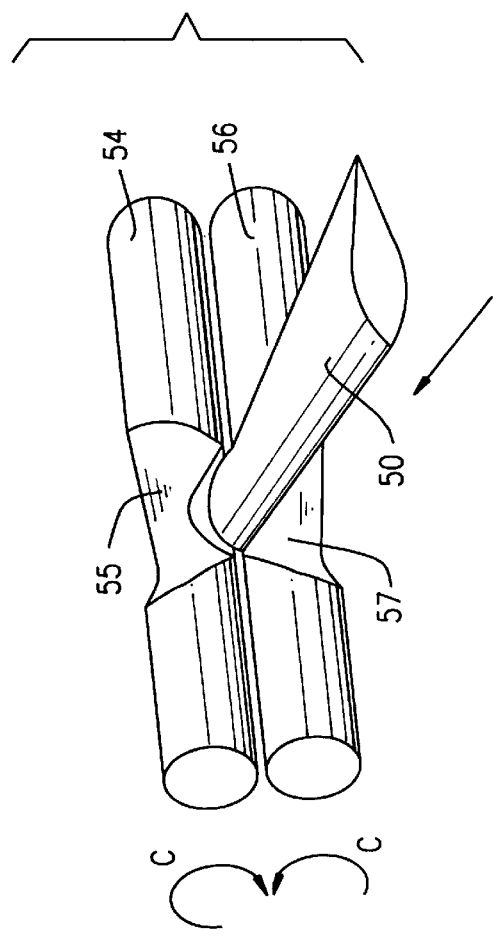
FIG. 9
FIG. 10

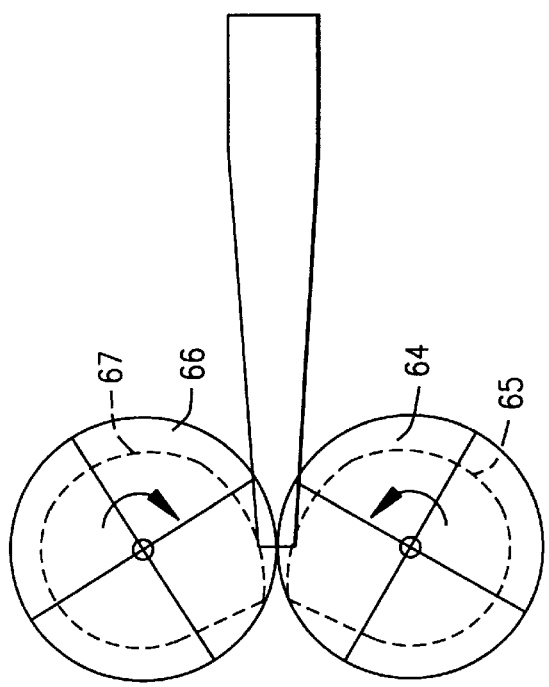
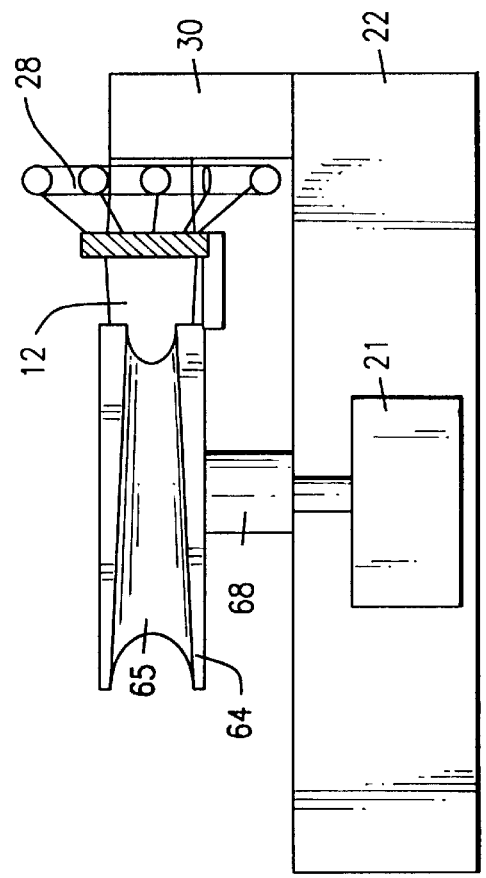
FIG. 12
FIG. 11

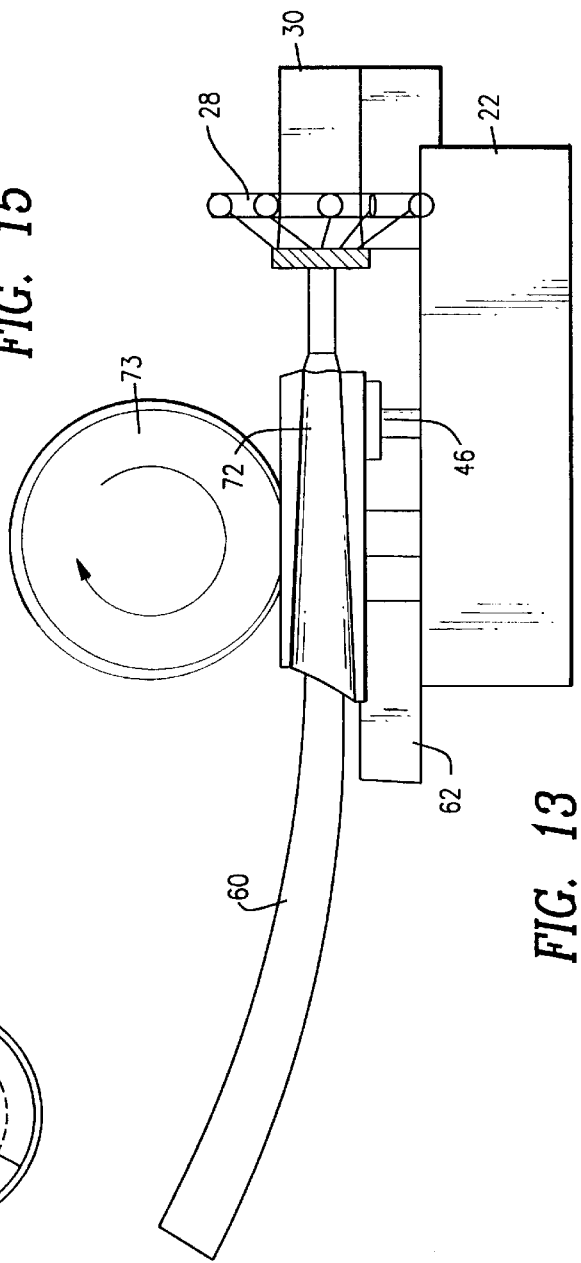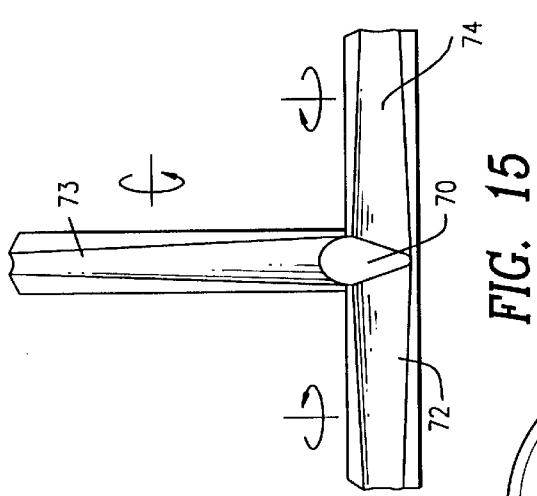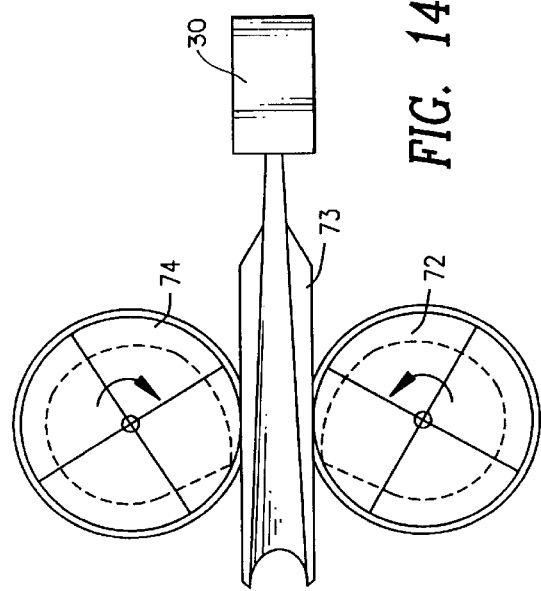

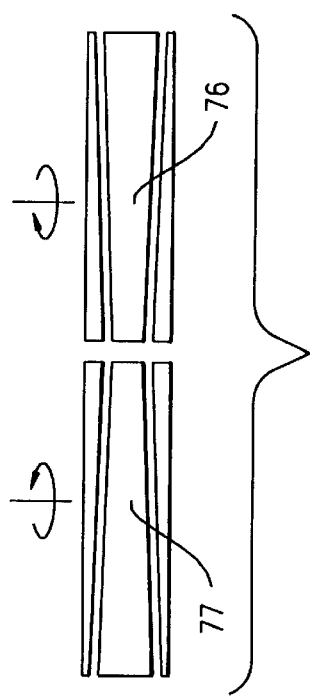
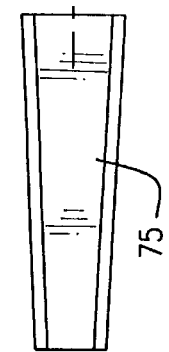
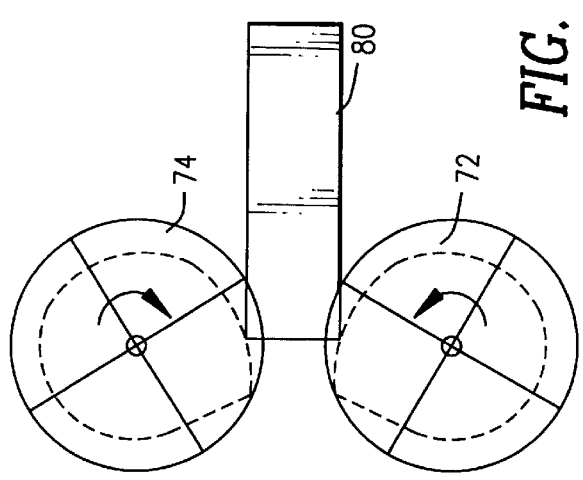
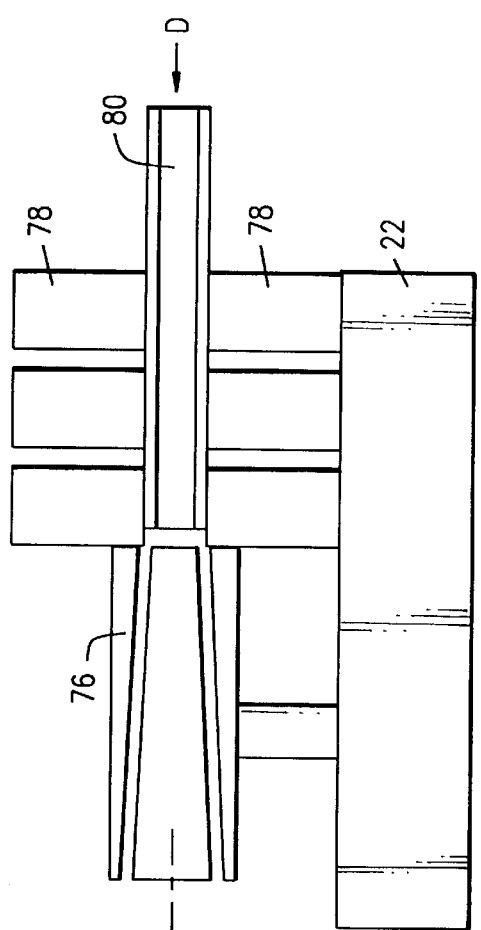
FIG. 19
FIG. 18
FIG. 17
FIG. 16

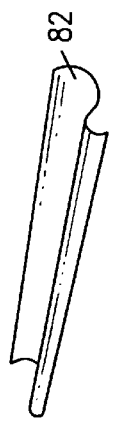
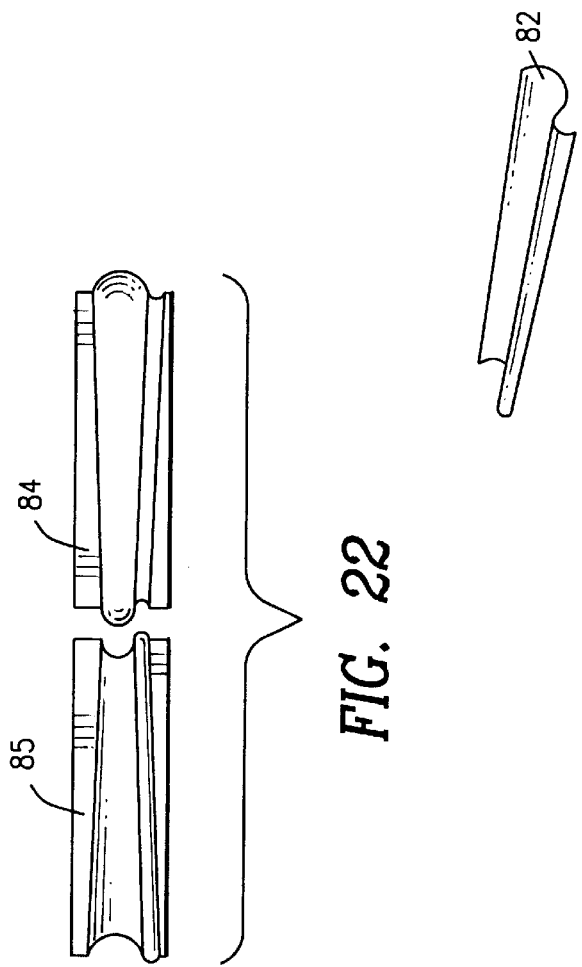
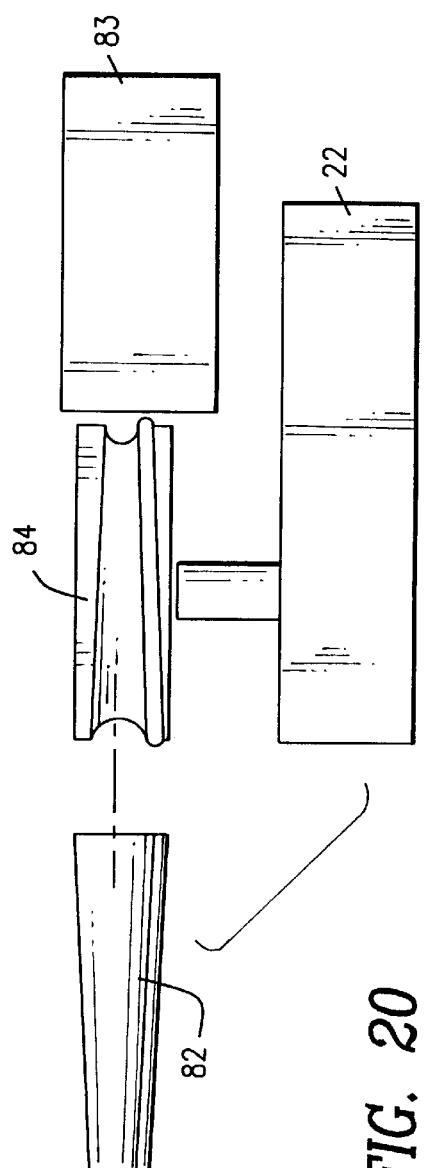
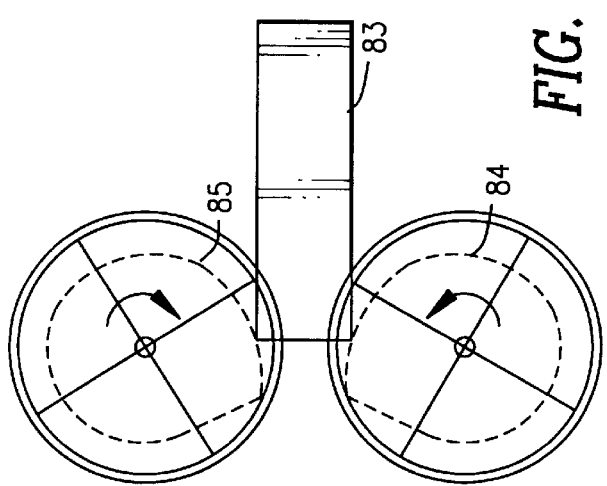

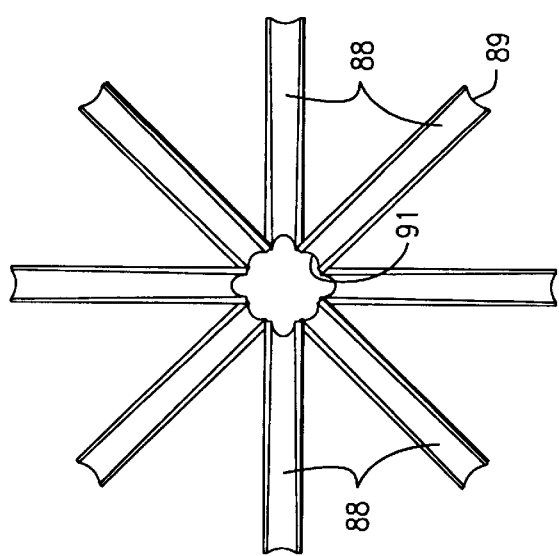
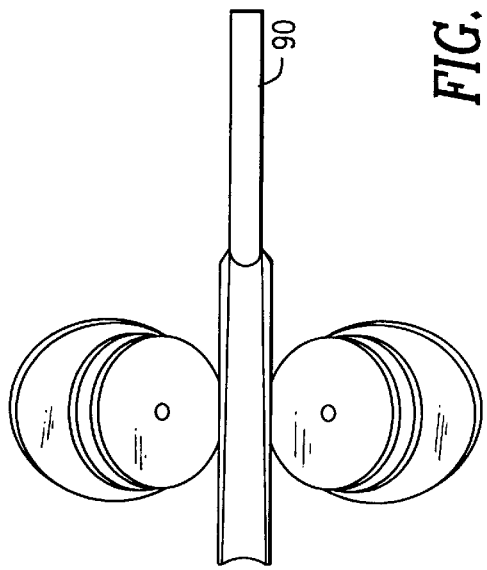
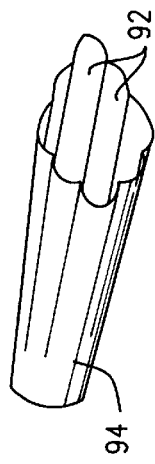

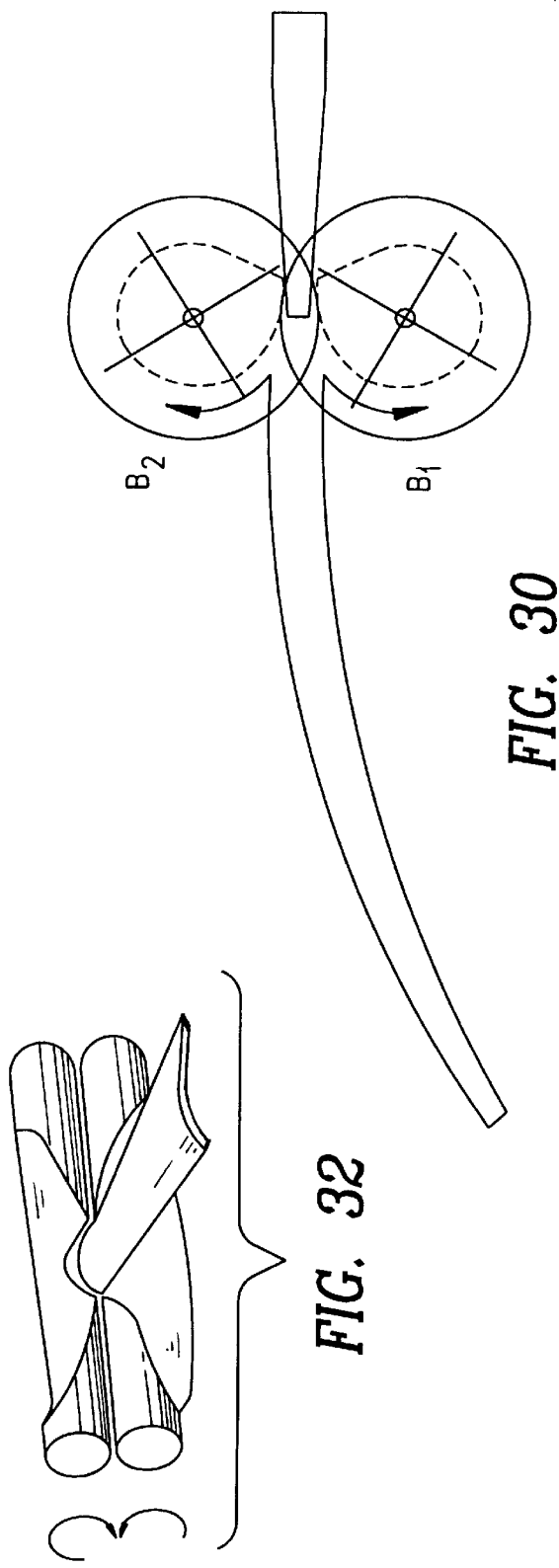
FIG. 30
FIG. 32
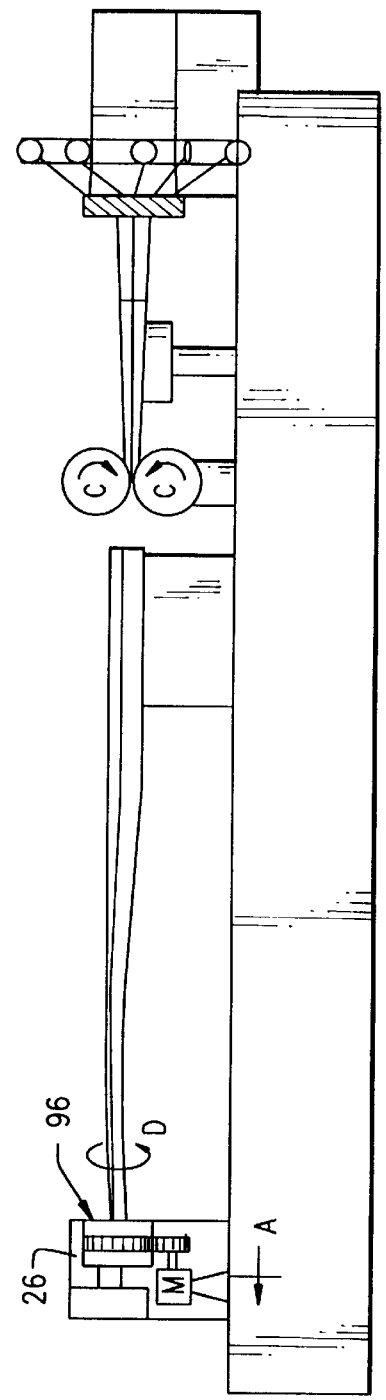
FIG. 31

APPARATUS AND METHOD FOR SHAPING AN ELONGATED MEMBER

FIELD AND BACKGROUND OF THE INVENTION

Various techniques are known for manufacturing elongated members including beams, such as eye-beams, posts, masts, air-foils, bars, tubes, channels, gutters and any number of elongated structures. The elongated members may be extruded, drawn, casted, deformed or formed into shape, or pultruded (a hybrid technique using extrusion and drawing of the elongated member together).

U.S. Pat. No. 2,760,228 discloses an apparatus for continuously shaping an extruded plastic tube formed around an elastic conductor using an endless belt having molded bosses therein.

U.S. Pat. No. 3,256,559 discloses equipment for making fiber reinforced resin material in which a hardened article is drawn after being heated in a forming process by means of a puller mechanism.

U.S. Pat. No. 3,476,625 discloses a method of forming a composite spar by molding around a metal tube utilizing a two piece mold.

U.S. Pat. No. 3,896,206 discloses a method of forming a tapered fiber reinforced shaft including a mold and a mandrel forced into the shaft.

U.S. Pat. No. 4,187,271 discloses a method of making fiber material utilizing two die pieces of a mold. Also, see U.S. Pat. No. 5,194,212.

U.S. Pat. Nos. 5,120,380; 5,264,170 and 5,366,773 are relevant for disclosing various types of pultrusion methods.

Finally, U.S. Defensive Publication T101,401 discloses a process and apparatus for forming glass fiber reinforced products using two die cavity-containing tracks.

Except for techniques such as those in T101,401 and U.S. Pat. No. 2,760,228, which are able to place discontinuities into the shape of an elongated product along its length, there is no known method for varying the geometry of an elongated member along its length using any continuous or quasi-continuous process. A product can be cast or molded to have a continuously varying shape but the length of the member is limited by the size of the mold or casting equipment. Even T101,401 and U.S. Pat. No. 2,760,228 have no way of continuously varying the geometry of the elongated member.

SUMMARY OF THE INVENTION

The present invention is an apparatus and method for shaping an elongated member so that the member has a varying shape or geometry along its length.

The apparatus of the invention includes a first element which has an outer surface for engaging against an elongated member to be shaped. The apparatus also includes a second element which has an outer form-defining surface for use in creating the varying shape on at least one side of the elongated member. The first and second elements are positioned so that they oppose each other with the form-defining surface extending at least partly along the second element and varying in shape along the second element. The elongated member is held between the surfaces of the first and second elements and drive means are used for moving the form-defining surface of the second element with respect to the surface of the first element and for moving the elongated member with respect to the first and second elements in order to create the varying shape of the elongated member.

Although the varying shape can be as simple as a taper, it can also be a complex shape, such as the introduction of ever increasing flutes in the outer surface of a tubular member, a smooth change in geometry of a gutter type member, or any other varying shape that can be created using the outer form-defining surface of the second element as a moving template.

In a preferred embodiment of the invention, both the first and second elements have complimentary form-defining surfaces and are mounted for pivotal movement so that they rotate with respect to each other and across the surface of the member. Since the elongated member can be moved at a linear speed which is the same as or greater than the circumferential rotational speed of the form-defining surfaces of the first and second elements, there is no limitation on the length of the elongated member and no fixed, proportioned relationship between the length of the member and the circumference of the rotating elements.

According to a further embodiment of the invention, the method of the invention, which can be thought of as a type of pultrusion process, can be used in conjunction with equipment for wrapping a elongated core die or member, for example, with prepreg carbon fibers (carbon fibers impregnated with uncured resin). The wrapped core is than pultruded through a pair of movable dies which form the first and second elements and which carry the form-defining surfaces.

The present invention can be adapted for use with a wide variety of elongated members, including but not limited to, eye-beams having tapering dimensions from one end to the other, sheet metal members such as gutters having varying geometry along their length, hollow tubular structures having varying geometries and shapes along their length, masts which taper, e.g. from the base of the mast to the top, air- or hydro-foils which taper from one end of the airfoil to the other, and any number of other elongated structures which can be shaped or deformed between the first and second elements of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is an exploded perspective view of the first and second element and a core element or inner die corresponding to the position of FIG. 2;

FIG. 6 is a view similar to FIG. 5 but corresponding to the position of FIG. 3;

FIG. 7 is a front elevational view of a bolt rope slot die for use with the apparatus of FIG. 1;

FIG. 8 is a side elevational view of the structure in FIG. 7;

FIG. 9 is a view similar to FIG. 1 of an apparatus for manufacturing an aerodynamic or hydrodynamic foil structure which tapers and which can be of an desired length;

FIG. 10 is a perspective view of the first and second elements of the invention of FIG. 9 in a position to form the small end of the foil;

FIG. 11 is a side elevational view similar to FIG. 4, of an alternative embodiment of the invention using rolling elements having a 360° circumferentially extending form-defining surface;

FIG. 12 is a top plan view of the structure of FIG. 11;

FIG. 13 is a side elevational view of another embodiment of the invention for creating an aerodynamically tapered and curved mast;

FIG. 14 is a top plan view thereof;

FIG. 15 is a front elevational view showing the entry passage formed by the three rotary form-defining members of the embodiment of FIG. 13;

FIG. 16 is a view similar to FIG. 13 of a further embodiment of the invention for forming an eye-beam which tapers and which is forged rather than pultruded according to the present invention;

FIG. 17 is a top plan view thereof;

FIG. 18 is a front elevational view showing the entry end of the form-defining shape between the first and second elements of the embodiment of FIG. 16;

FIG. 19 is a perspective view of a tapered eye-beam manufactured according to the present invention;

FIG. 20 is a view similar to FIG. 16 of another embodiment of the invention for forming an elongated member made of sheet metal;

FIG. 21 is a top plan view thereof;

FIG. 22 is front elevational view of the first and second elements thereof;

FIG. 23 is a perspective view of the elongated sheet metal member manufactured with the apparatus of FIG. 20;

FIG. 24 is a view similar to FIG. 20 of a further embodiment of the invention for manufacturing an elongated hollow member having a varying geometry and shape along its length;

FIG. 25 is a front elevational view of entry port created by the various rotary elements of the embodiment of FIG. 24;

FIG. 26 is a perspective view of a hollow elongated member manufactured with the apparatus of FIG. 24;

FIG. 27 is a top plan view of the member of FIG. 26;

FIG. 28 is a rear elevational view of the member of FIG. 26;

FIG. 29 is a front elevational view of the member of FIG. 26;

FIG. 30 is a top plan view of another embodiment of the invention illustrating how a differential speed between the first and second elements can introduce a curve in the elongated member;

FIG. 31 is a side elevational view of another embodiment of the invention which further modifies the shape of the elongated member; and FIG. 32 is a view like FIG. 10 of rollers for making a wing.

DESCRIPTION OF THE PREFERRED EMBODIMENTS

Figure 1:
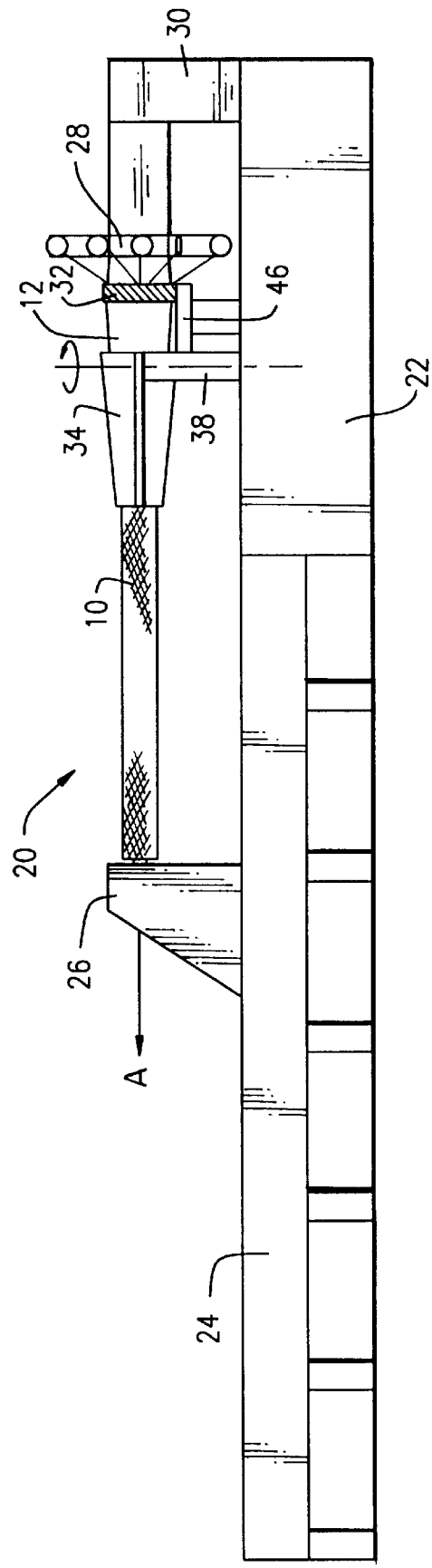
FIG. 1 is a side elevational view of an apparatus according to the present invention including all structures needed to create an elongated member such as a mast having a varying shape along its length.

Referring to the drawings in particular, the invention embodied in FIGS. 1–8 comprises a method and apparatus for shaping an elongated member 10 so that it has a varying geometry or shape along at least part of its length. In the embodiment of FIG. 1, the member comprises a mast for a boat or ship which tapers from a broad base to a narrow top and which has a specialized cross section best shown in FIG. 5.

The apparatus of FIG. 1 is in the form of a pultrusion apparatus generally designated 20 having a main support platform 22 and an elongated pulling rail 24. A puller 26 is mounted for linear movement in the direction of arrow A along rail 24. A weaving harness 28 is provided for carrying a plurality of spools of fiber, for example, prepreg carbon fibers (carbon fibers prepregnated with uncured resin). Harness 28 is mounted for rotation on a weaving mechanism 30 supported on platform 22, for feeding fiber through an alignment ring 32. Fibers, for example, the prepreg carbon fibers, are wrapped by weaving harness 28 around a core or inner die 12 which forms a permanent or removable core of the elongated member 10. Simultaneous with the weaving of fibers around the outer surface of core 12, core 12 is pulled by puller 26 in the direction of arrow A. Heating elements are also provided in the apparatus 20 for heating the prepreg fibers which results in curing and hardening of the fibers and curing of the elongated member 10.

Figure 2:
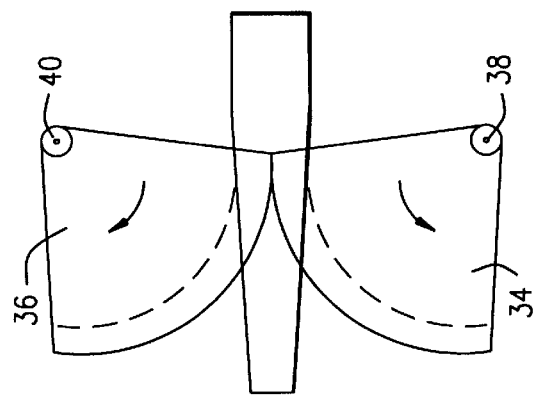
FIG. 2 is a top plan view of a portion of the apparatus of FIG. 1 containing the first and second elements of the invention and in a position for forming the large end of a mast.
Figure 3:
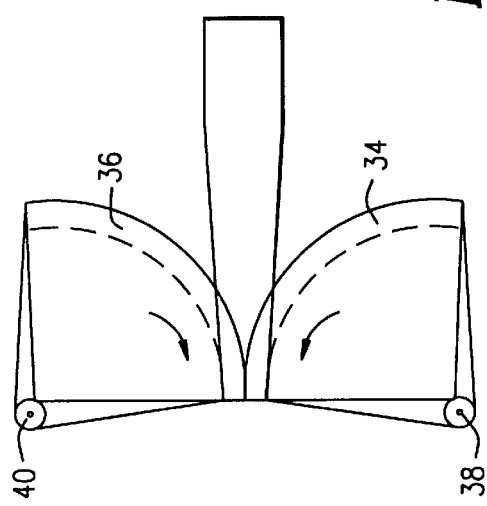
FIG. 3 is a view similar to FIG. 2 showing the position of the first and second elements during the formation of the small end of the mast.
Figure 4:
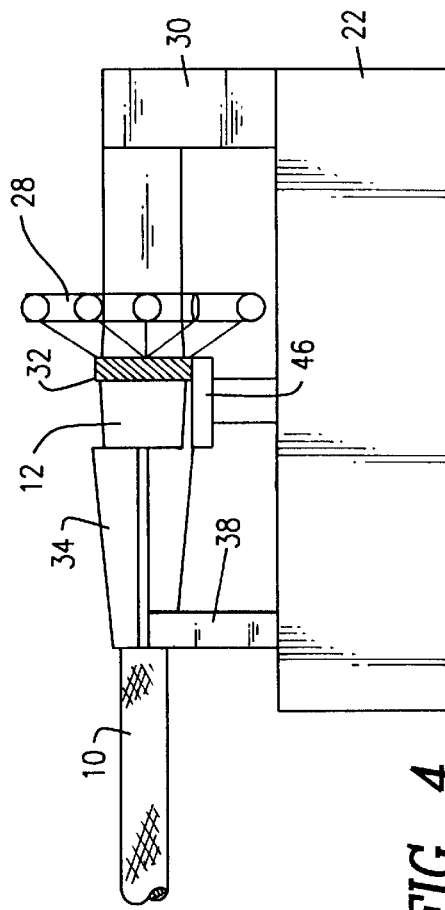
FIG. 4 is a side elevational view of a portion of the apparatus of FIG. 1 showing the first and second elements in the position for forming the small end of the mast.

In accordance with the main feature of the present invention, the core 12 tapers from one end to the other with the large end at the right and the small end at the left, held by puller 26. As the core which is being covered with the fibers, moves to the left in FIG. 1, it moves past and between first and second elements 34, 36 which are each mounted for rotation about a vertical axis on rotation shafts 38 and 40 which are also supported on platform 22. As best shown in FIGS. 2 and 3, first and second elements 34, 36 rotate in opposite directions.

As best shown in FIGS. 5 and 6, first element 34 has an inner form-defining surface 35 which comprises a concave trough which is wide at one circumferential end of the segment shaped first element 34, and narrow at the opposite end. The second element 36 has a mirror image form-defining surface 37.

With the form-defining surfaces 35, 37 facing each other and with the broad ends of the surfaces in the position of FIGS. 2 and 5, puller 26 begins to pull inner core 12 in the direction of arrow A. Heating of the prepreg fibers is achieved by heating elements 42 which are provided on the outer surfaces of first and second elements 34, 36, and if needed, a core heating element 44 is provided inside the core or inner die 12. Advantageously, the carbon fiber prepreg weave is heated and cured at a temperature of about 150° to 200° F. as it passes through the space between the first and second elements 34, 36.

In order to obtain the tapered shape for mast 10, the elements 34, 36 slowly rotate in the direction of arrows B in FIG. 5. The elements 34, 36 rotate about their axes on their respective shafts 38, 40 to move from the position of FIG. 6 that forms the small end of the mast to the position of FIG. 5 that forms the large end of the mast.

There is no requirement that the circumferences of the form-defining surfaces 35, 37 be equal to the length of elongated member 10 since a relative slipping can be accommodated between the first and second elements 34, 36, which can rotate at a slower circumferential speed than the linear speed of the elongated member 10. Drive means are provided in platform 22 for rotating the segment shaped first and second elements 34, 36.

In the embodiment of FIGS. 1–8, a bolt rope slot die 46 is fixed to platform 22 below the inner core 12 in order to form the bolt rope slot 47 in the elongated member 10. FIGS. 7 and 8 further illustrate the shape of the bolt rope slot die.

Although the embodiment of FIGS. 1–8 includes two rotary elements 34, 36 and a core or inner die 12, a single rotary element can be used in conjunction with an inner die or two rotary elements can be used without an inner die. Further, the inner die may or may not form a structural unit with the elongated member 10. The invention includes the possibility of removing the die 12 and leaving only the shell made of now cured fibers as elongated member 10. This is the preferred form of manufacturing the mast which automatically removes the inner heating element 44 from the final structure as well.

In the remaining figures, the same reference numerals are utilized to designate the same or functionally similar parts as those utilized in FIGS. 1–8.

In FIGS. 9 and 10, the manufacturer of an aerodynamic or hydrodynamic foil shaped mast or air foil 50 is illustrated. A foil-shaped core 52 is provided which is pulled through the weaving harness 28 where the core 52 is covered by fibers. The core 52 is then moved and shaped between a pair of roller elements 54, 56 which are mounted for rotation about horizontal axes. Roller elements 54,56 are driven in opposite directions, shown by arrows C, by drive means schematically represented by the platform 22.

As best shown in FIG. 10, the roller elements include a pair of complementary form-defining surfaces 54, 56 which vary in shape around the circumference of the rollers. Unlike the embodiment of FIG. 1, the embodiment of FIG. 9 utilizes first and second elements which have a form-defining surface which varies around the entire circumference of each roller element rather than only around a part or segment of the circumference. The common feature, however, is that both embodiments use rotary elements having circumferentially varying shapes.

If it is desired to include a slot, a slot die 46 can be provided in the embodiment of FIG. 9.

FIGS. 11 and 12 illustrate a further embodiment of the invention utilizing a pair of roller elements 64, 66 with facing circumferential grooves 65, 67 which have a varying shape, for example, a trough shape which increases in size, around the circumference of the roller elements. Each roller element is mounted for rotation on a vertical shaft. One of the shafts is shown at 68 in FIG. 11 and they are driven by motor means 21 in the platform 22.

FIGS. 13–15 show a further embodiment of the invention for producing a mast or other elongated member 60 which has a cross-sectional shape that is foil-shaped or aerodynamic as shown by aperture 70 formed among three rotary elements 72, 73, 74 which each have varying form-defining surfaces around the circumference of the elements and are each mounted for rotation in complimentary directions to form the member 60.

An added feature in the embodiment of FIG. 13 is a bend die 62 mounted on platform 22, just under the mast 60 and having an upwardly curved upper surface for steering and bending the mast 60 upwardly before it completely cures. By placing the bend die 62 immediately downstream of the roller elements 72, 73, 74 the mast 60 is still warm and can follow the bend as the shape of the mast is changed.

FIG. 15 shows the largest aperture 70 formed between the form-defining surfaces of the roller elements 72, 73, 74 designated 72, 73, 74. When rotated through almost 360°, the smallest aperture is formed, which corresponds to the small end of the mast 60.

FIGS. 16–19 illustrate an embodiment of the invention for shaping a tapered eye-beam 75 using a pair of grooved rollers 76 and 77 mounted for rotation in opposite directions on a drive platform 22. In order to create the tapered eye-beam 75, an eye-beam blank 80 having consistent dimensions throughout its length, is passed between upper and lower heater banks 78 which may also include rollers or other pushing means for pushing the blank 80 in the direction of arrow D between rollers 76, 77.

Each of the rollers 76, 79 contains a double groove having spacing which changes around the circumference of the roller. When the upper and lower plates of eye-beam blank 80 enter the upper and lower grooves, and due to heating and forcing of the eye-beam blank material, the metal of the eye-beam blank 80 is forged and deformed to take on the tapered shape. Both the width of the plate and the spacing between the plates can be changed in accordance with the present invention by selecting varying shapes and placements of the grooves in elements 76 and 77.

FIGS. 20–23 illustrate an embodiment of the invention for creating elongated sheet metal forms 82 using the principles of the present invention.

An initially flat sheet metal blank 83 is fed between rollers 84 and 85 which have complimentary form-defining surfaces best shown in FIG. 22.

Since the form-defining surfaces change around the circumferences of the rollers 84, 85, the shape of the formed member 82 will change as the rollers 84, 85 are rotated, for example, a trough which is initially broad and then narrow (or conversely initially narrow and then broad) can be formed using the invention as shown in FIGS. 20–23.

FIGS. 24–27 show a further embodiment of the invention which uses a multiplicity of rollers 88, each having a groove which at one arc section shown at 89 conforms to the circumference of a tubular blank 90, and at another arc section 91 has a deeper and more rounded shape in order to form flutes 92 in elongated member 94 at one end of the member as shown in FIGS. 26, 27 while no flutes are provided at the opposite ends. If the blank 90 is sufficiently strong, no inner die or core is necessary since the material of the tubular blank 90 will be self-supporting during the deforming process. Alternatively, a core having the shape of the interior of the finished product 94 can be provided during the forming process and then removed.

FIG. 30 illustrates an embodiment of the invention where one of the first and second elements is rotated at a slower speed (B1) than the other element (at speed B2) This differential in speed causes one surface of the elongated member to drag by a greater extent than the other surface and, thus, introduces a curve into the member. In the extreme case which is also contemplated within the scope of the present invention, one of the first and second elements can be held fixed while only the other moves.

FIG. 31 illustrates another embodiment of the invention which utilizes a puller 26 mounted for movement in the pulling direction A and in conjunction with the rotation C, to form the elongated member. In addition, puller 26 incorporates rotation means generally designated 96, for slowly rotating the end of the elongated member in the direction of arrow D, to introduce a further modification in the shape of the elongated member. The embodiment of FIG. 31 is particularly useful for making air-foils such as wings for an aircraft or blades for a helicopter which often have a helical twist. In addition to helicopter blades, propellers blades of various types including air propellers and water propeller can be manufactured by the present invention. A twist can also be introduced into other elements manufactured according to the present invention.

It is noted that the present invention can work on a wide variety of material for the elongated member including, but not limited to, aluminum, steel or other metals, plastics including a wide variety of polymers including composites such as fiber reinforced polymers.

Although many of the embodiments illustrated show, as example, the construction of masts, this in no way limits the scope of the invention. As noted above, air-foils, wings, eye-beams and any other wide variety of elongated members can be manufactured according to the invention. See FIG. 32 for example where non-symmetric rollers or dies of the invention can be used to form a tapered wing or blade having an air-foil shape, and being any size and any width.

The linear slot introduced, for example, with the bolt die, has a constant dimension along the length of the elongated member even though the elongated member itself may vary in cross-sectional shape and/or dimension.

The present invention can also be applied to a wide range of sizes for the elongated member, for example, members from 10 ft. to 200 ft. can be manufactured and members having widths of 6 in. to 6 ft. can be manufactured. These are by no means limits since smaller and larger elongated members can also be manufactured using the principles of the present invention.

While specific embodiments of the invention have been shown and described in detail to illustrate the application of the principles of the invention, it will be understood that the invention may be embodied otherwise without departing from such principles.

What is claimed is:

1. An apparatus for shaping an elongated member so that it has a smoothly varying shape along at least part of its length, comprising:
    a first roller element having an outer, curved, form-defining surface for engagement against an elongated member to be shaped and for use in creating a varying shape on one side of the elongated member;
    a second roller element having an outer, curved, form-defining surface for use in creating a varying shape on an opposite side of the elongated member which is opposite from the first roller element, the form-defining surfaces each having a circumferential length and defining an aperture therebetween, and extending at least partly around circumferences of the first roller element and the second roller element respectively, and varying in shape around the first and second roller elements, the elongated member being hold between the surfaces of the first and second roller elements;
    first drive means for rotating the form-defining surfaces of the first element and the second element with respect to the elongated member and in opposite directions with respect to each other; and
    second drive means for pulling the elongated member through the aperture and with respect to the first and second elements at a rate which is faster than rotation of the elements for forming the varying shape in the elongated member and so that the varying shape is longer than the circumferencial length of the form-defining surfaces.

2. An apparatus according to claim 1, including an elongated core die for movement between the first and second roller elements for forming an interior of the elongated member.

3. An apparatus according to claim 2, wherein each form-defining surface comprises a concave, smoothly varying groove in the first and second roller elements.

4. An apparatus according to claim 3, wherein each roller comprises only a section of a circular path.

5. An apparatus according to claim 3, wherein each roller extends around 360°.

6. An apparatus according to claim 2, including heating means in at least one of the first and second roller elements and the core die, for heating the elongated member, and weaving means for weaving a covering onto the core die to form the elongated member.

7. An apparatus according to claim 6; including a base slot die which is fixed with respect to the core die and adjacent the core die for forming a slot in the elongated member.

8. An apparatus according to claim 1, wherein the first and second elements each include a form-defining surface comprising a groove having a varying shape around the circumference of each of the first and second elements.

9. An apparatus according to claim 3, wherein the shape of each groove forms a portion of a foil-shaped aperture for producing an elongated member with a foil-shaped cross section.

10. An apparatus according to claim 1, including a third element having a form-defining surface extending around at least part of the circumference of the third element and cooperating with the first and second elements to create an aperture between the form-defining surfaces of the first, second and third elements, the aperture having a changing size and shape as the first, second and third elements are rotated.

11. An apparatus according to claim 1, including a bending die fixed at a downstream location with respect to a direction of movement of the elongated member for bending the elongated member as it leaves the aperture.

12. An apparatus according to claim 1, wherein the form-defining surface of each of the first and second elements comprises a pair of grooves having at least one of a varying spacing and a varying depth around the circumference of the first and second elements for creating an elongated member in the form of a tapering eye-beam.

13. An apparatus according to claim 1, wherein the form-defining surface of the first element compliments the form-defining surface of the second element for creating a slot for receiving and shaping a sheet metal blank to form an elongated member from the sheet metal having a varying shape along the length of the elongated member.

14. A method of shaping an elongated member so that it has a smoothly varying shape along at least part of its length, comprising:
    pulling a blank through an aperture formed between a first element having an outer form-defining surface for engagement against the blank, and a second element having an outer form-defining surface for use in creating a varying shape on at least one of two sides of the blank, the form-defining surface extending at least partly along each element and varying in shape along each element;

moving the first and second elements with respect to each other while pulling the blank through the aperture formed between the first and second elements the blank being pulled at a greater rate than movement of the first and second elements so that there is a differential in movement between the form-defining surfaces and an outer surface of the blank, the length of the form-defining surfaces being less than the length of the blank; and removing the blank after it is passed through the aperture between the first and second elements, the blank having been shaped into the elongated member with a smoothly varying shape along its length corresponding to a shape generated by each form-defining surface;

the first and second elements both being roller elements, the method including rotating the first and second roller elements in opposite directions;

at least one of the form-defining surfaces comprising a groove extending around the circumference of the element and having a varying shape or size.

15. A method according to claim 14 including moving a core through the aperture, the core having an outer surface which varies along a length of the core and cooperates with the form-defining surfaces to shape inner and outer surfaces of the blank, the core being moved at a different rate than the blank.

* * * * *